US011438507B2

(12) United States Patent
Boron et al.

(10) Patent No.: US 11,438,507 B2
(45) Date of Patent: Sep. 6, 2022

(54) CAMERA FOR A VEHICLE VISION SYSTEM

(71) Applicant: Aptiv Technologies Limited, St. Michael (BB)

(72) Inventors: Artur Boron, Czernichów (PL); Maciej Barszczowski, Bielsko-Biala (PL)

(73) Assignee: Aptiv Technologies Limited, St. Michael (BB)

(*) Notice: Subject to any disclaimer, the term of this patent is extended or adjusted under 35 U.S.C. 154(b) by 0 days.

(21) Appl. No.: 17/271,545

(22) PCT Filed: Oct. 18, 2019

(86) PCT No.: PCT/EP2019/078442
§ 371 (c)(1),
(2) Date: Feb. 25, 2021

(87) PCT Pub. No.: WO2020/079260
PCT Pub. Date: Apr. 23, 2020

(65) Prior Publication Data
US 2021/0250502 A1      Aug. 12, 2021

(30) Foreign Application Priority Data
Oct. 18, 2018  (EP) .................................... 18201204

(51) Int. Cl.
*H04N 5/232*      (2006.01)
*H04N 5/225*      (2006.01)
*H04N 7/18*       (2006.01)

(52) U.S. Cl.
CPC ....... *H04N 5/23241* (2013.01); *H04N 5/2256* (2013.01); *H04N 7/18* (2013.01)

(58) Field of Classification Search
CPC ..... H04N 5/23241; H04N 5/2256; H04N 7/18
See application file for complete search history.

(56) References Cited

U.S. PATENT DOCUMENTS 7,902,769 B2 *  3/2011  Shteynberg .......... H05B 45/345
                                                   315/308
8,928,240 B2 *  1/2015  Raj ....................... H05B 45/60
                                                   315/241 R
(Continued)

FOREIGN PATENT DOCUMENTS

EP       1246118      10/2002
WO     2020079260      4/2020

OTHER PUBLICATIONS

"Extended European Search Report", EP Application No. 18201204. 7, dated Mar. 28, 2019, 7 pages.
(Continued)

*Primary Examiner* — Boubacar Abdou Tchoussou
(74) *Attorney, Agent, or Firm* — Sawtooth Patent Group PLLC

(57) ABSTRACT

Camera for a motor vehicle configured to communicate with an electronic control unit of the motor vehicle comprises an imager integrated circuit configured to capture images from the motor vehicle; an illumination unit; a first mixer/splitter interface unit in electrical communication with the imager integrated circuit; a camera bidirectional signal port in electrical communication with the first mixer/splitter interface unit, said camera bidirectional signal port being configured to be electrically connected with an external power supply signal carrying data control signal for the imager integrated circuit; said first mixer/splitter interface unit being configured to split the data control signal from the external power supply signal; to provide the split data control signal to the imager integrated circuit, to provide a first input voltage from the split external power supply signal to the imager integrated circuit; to provide images data from the imager integrated circuit mixed with the external power supply signal to the camera bidirectional (Continued)

signal port; to provide a second input voltage from the split external power supply signal to the illumination unit.

20 Claims, 1 Drawing Sheet

(56) References Cited

U.S. PATENT DOCUMENTS

| | | | |
|---|---|---|---|
| 9,900,490 B2* | 2/2018 | Ihlenburg | H01B 7/0216 |
| 10,284,764 B2* | 5/2019 | Ihlenburg | H04N 5/23241 |
| 10,567,633 B2* | 2/2020 | Ihlenburg | B60R 16/02 |
| 10,567,705 B2* | 2/2020 | Ziegenspeck | H04N 7/183 |
| 10,761,319 B2* | 9/2020 | Kumar | G02B 27/0006 |
| 10,827,108 B2* | 11/2020 | Ihlenburg | H01B 3/445 |
| 2002/0134835 A1 | 9/2002 | Kennedy | |
| 2007/0182338 A1* | 8/2007 | Shteynberg | H05B 45/345 315/200 R |
| 2011/0037399 A1 | 2/2011 | Hung et al. | |
| 2012/0050550 A1* | 3/2012 | Oba | H04N 5/23203 348/207.99 |
| 2013/0043803 A1* | 2/2013 | Raj | H05B 45/60 315/241 R |
| 2013/0187445 A1* | 7/2013 | Mutzabaugh | H04B 3/548 307/1 |
| 2014/0160291 A1* | 6/2014 | Schaffner | H04N 5/374 348/148 |
| 2014/0218535 A1* | 8/2014 | Ihlenburg | H04N 7/10 348/148 |
| 2014/0362209 A1* | 12/2014 | Ziegenspeck | H04N 7/183 348/113 |
| 2016/0072991 A1 | 3/2016 | Dinev | |
| 2016/0198151 A1 | 7/2016 | Schmid | |
| 2017/0174131 A1* | 6/2017 | Sigle | H04N 7/181 |
| 2018/0109755 A1 | 4/2018 | Vaid et al. | |
| 2019/0113743 A1* | 4/2019 | Kumar | B60R 11/04 |
| 2020/0119718 A1* | 4/2020 | He | H03H 11/04 |

OTHER PUBLICATIONS

"International Search Report and Written Opinion", Application No. PCT/EP2019/078422, dated Jan. 2, 2020, 14 pages.
"International Preliminary Report on Patentability", Application No. PCT/EP2019/078442, dated Apr. 14, 2021, 8 pages.
"Foreign Office Action", CN Application No. 201980068854.4, dated Dec. 27, 2021, 28 pages.

* cited by examiner

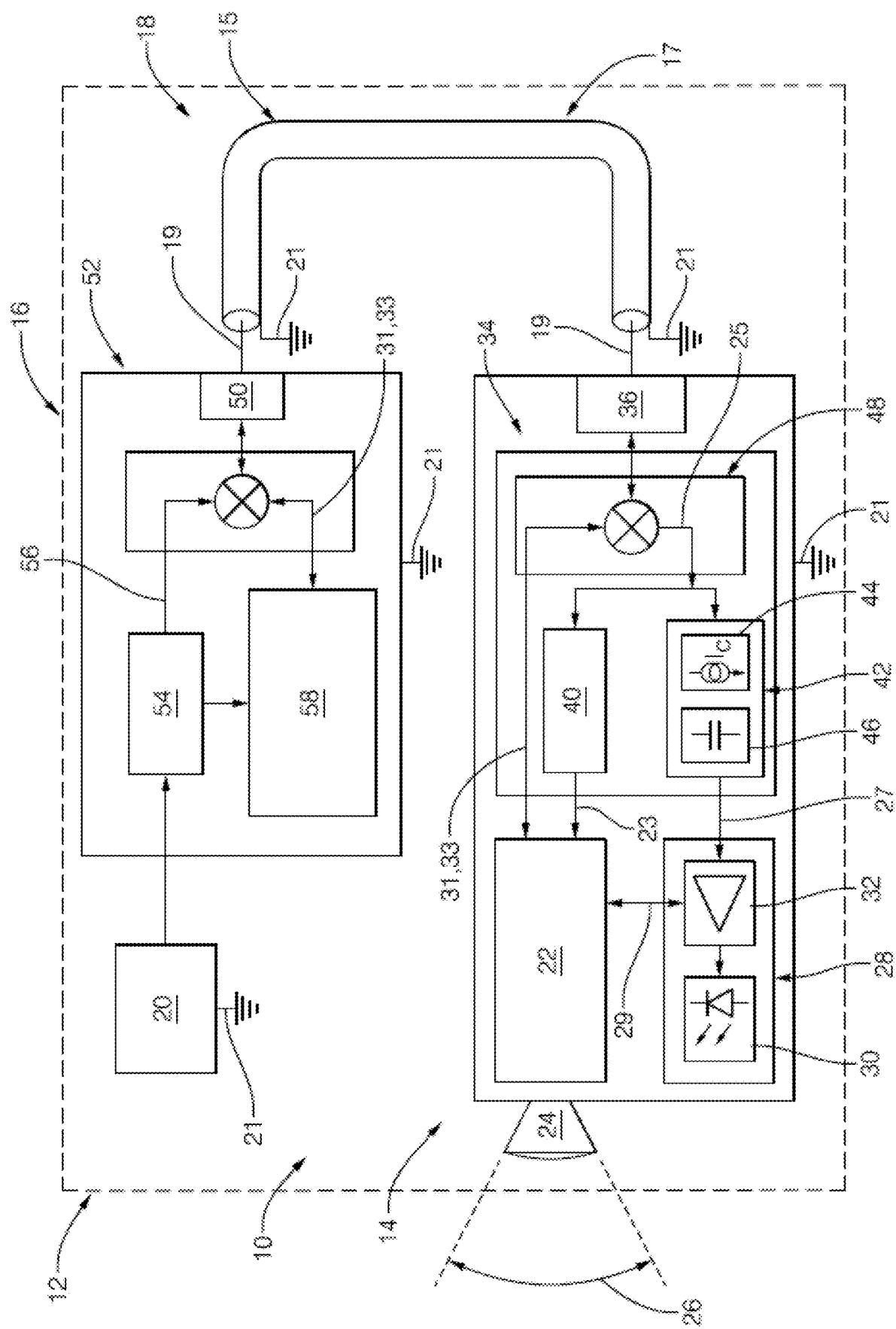

CAMERA FOR A VEHICLE VISION SYSTEM

CROSS REFERENCE TO RELATED APPLICATIONS

This application is a national stage entry of International Application No. PCT/EP2019/078442, filed Oct. 18, 2019, which in turn claims priority to European Patent Application Number 18201204.7, filed Oct. 18, 2018, the disclosures of which are incorporated herein by reference in their entirety.

TECHNICAL FIELD OF THE INVENTION

The invention relates to a camera for a vision system of a motor vehicle. More particularly the invention relates to a camera with an active illumination comprises a single current-carrier line supply source.

BACKGROUND OF THE INVENTION

Cameras comprises a current-carrier line supply source are generally used in motor vehicle, wherein data to control the camera and the power supply of the camera are carried by a coaxial cable connected to the camera. When light source are integrated inside the camera, control of the light source and power supply of the light source are remotely arranged from the camera such that extra wires connected to the camera, in addition with the coaxial cable, are necessary.

Such extra connections of the camera relative to the light source are necessary to prevent disturbance of the power supply of the imager integrated circuit of the camera and failures on the signals data of the camera that may result from the inrush current of the light source, and from conducted emissivity over power supply of the light source.

However, the extra connections are not a suitable solution as increasing the size of the camera and increasing the complexity of the electrical harness of the motor vehicle.

It is therefore important to propose a new solution to solve these problems.

SUMMARY OF THE INVENTION

According to one embodiment of the invention, a camera for a motor vehicle configured to communicate with an electronic control unit (ECU) of the motor vehicle an imager integrated circuit configured to capture images from the motor vehicle inside or outside environment; an illumination unit comprising at least one light source component, the illumination unit being configured to illuminate the inside/outside environment of the motor vehicle; a first mixer/splitter interface unit in electrical communication with the imager integrated circuit; a camera bidirectional signal port in electrical communication with the first mixer/splitter interface unit, said camera bidirectional signal port being configured to be electrically connected with an external power supply signal carrying data control signal for the imager integrated circuit; said first mixer/splitter interface unit being configured to split the data control signal from the external power supply signal; to provide the split data control signal to the imager integrated circuit, and to provide a first input voltage from the split external power supply signal to the imager integrated circuit; said first mixer/splitter interface unit being further configured to provide images data from the imager integrated circuit mixed with the external power supply signal to the camera bidirectional signal port. The first mixer/splitter interface unit is in electrical communication with the illumination unit, said first mixer/splitter interface unit being configured to provide a second input voltage, distinct from the first input voltage, from the split external power supply signal to the illumination unit.

The first mixer/splitter interface unit may comprise a first power over coaxial (PoC) filter element in electrical communication with the camera bidirectional signal port, said first PoC filter element being configured to split the data control signal from the external power supply signal and to provide the split data control signal to the imager integrated circuit. The first mixer/splitter interface unit may further comprise a first voltage regulator element in electrical communication with the first PoC filter element and configured to provide the first input voltage to the imager integrated circuit from the split external power supply signal. The first mixer/splitter interface unit may further comprise a second voltage regulator element in electrical communication with the first PoC filter element and configured to provide the second input voltage from the split external power supply signal to the illumination unit.

The first PoC filter element may be further configured to mix the images data with the external power supply signal.

The second voltage regulator element may comprise a constant current source and an energy storage component configured to be fed by the constant current source, said energy storage component being configured to provide the second input voltage to the illumination unit.

The illumination unit may comprise a light source driver configured to control the illumination of the light source component. The light source component may be an infrared light source component. The light source driver may be configured to provide a pulsed power signal to the light source component such that the light source component provides a pulsed illumination.

The imager integrated circuit may comprise a trigger pin in electrical communication with the illumination unit, the imager integrated circuit being configured to trigger the illumination unit.

The illumination unit may comprise a light source failure detection component configured to detect a failure of the light source component, said light source failure detection component being configured to provide light source component diagnostic data to the first mixer/splitter interface unit, said first mixer/splitter interface unit being configured to provide the light source component diagnostic data mixed with the external power supply signal to the camera bidirectional signal port.

According to one embodiment of the invention, a vision system for a motor vehicle comprises the camera as described above. The vision system further comprises an ECU comprises an ECU bidirectional signal port, a second mixer/splitter interface unit in electrical communication with the ECU bidirectional signal port, the external power supply signal in electrical communication with the second mixer/splitter interface unit; a microcontroller configured to provide the data control signal to the second mixer/splitter interface unit. The vision system further comprises a coaxial cable connected at one extremity end to the ECU bidirectional signal port, and at the second extremity end to the camera bidirectional signal port. The second mixer/splitter interface unit is configured to provide the data control signal mixed with the external power supply signal to the ECU bidirectional signal port such that the coaxial cable is configured to electrically carrying the external power supply signal mixed with the data control signal. The second mixer/splitter interface unit is configured to receive the images data mixed with the external power supply signal carried by the coaxial cable; and to split the images data from the external power supply in order to provide the images data to the microcontroller.

BRIEF DESCRIPTION OF THE DRAWING

Other features, objects and advantages of the invention will become apparent from reading the detailed description that follows, and the attached drawing, given by way of example and in which:

FIG. 1 is a schematic diagram of a vision system of a motor vehicle according to one embodiment of the invention.

DETAILED DESCRIPTION OF THE PREFFERED EMBODIMENTS

According to FIG. 1, a vision system 10 for a motor vehicle 12 is shown. The vision system 10 can be used either for the external vision of the motor vehicle 10 such as for lanes monitoring system, for road signs monitoring system, as for the internal vision of the motor vehicle 12 such as for driver monitoring system. The vision system 10 may be also either used for automated vehicles i.e. driverless vehicles, than for manual vehicles wherein a driver controls the motor vehicle 12. The vision system 10 may be also used for advanced driver-assistance systems of a motor vehicle 12.

Even if not represented, it makes clear that the vision system 10 may be connected with some devices of the motor vehicle 12 such as braking system, steering wheel system, warning systems and others.

According to the invention, the vision system 10 comprises a camera 14 configured to monitor the outside of the motor vehicle 12 or the body compartment of the motor vehicle 12. The vision system 10 further comprises an electronic control unit (ECU) 16 configured to control the camera 14 and to process images captured by the camera 14. The vision system 10 further comprises only a one wire connection 19 between the ECU 16 and the camera 14. More particularly, the camera 14 has only a one wire connection 19 that has to carry the power supply 15 of the camera 14 and the signals data 17 exchanged between the camera 14, and the ECU 16 such that data control 31 from the ECU 16 to the camera 14 and images data 33 or video data from the camera 14 to the ECU 16. More particularly, the signals data 17 are carried by the power supply 15 signal such that the one wire connection 19 is a current-carrier line supply source.

The one wire connection 19 is part of a coaxial cable 18 connected at one extremity end to the ECU 16 and at the second extremity end to the camera 14. The camera 14, the ECU 16 and the coaxial cable 18 are grounded to a common electrical ground 21 that may be the body of the motor vehicle 12. Generally, the vision system 10 is supplied by a voltage source 20 that may be a battery of the motor vehicle 12. The voltage source 20 is generally directly connected to the ECU 16 such that the ECU 16 is configured to provide the power supply 15 of the camera 14.

The camera 14 that is configured to communicate with the ECU 16 comprises an imager integrated circuit 22 configured to capture the images from the motor vehicle 12 inside or outside environment. The imager integrated circuit 22 receives images from the field of view 26 of the lens 24 of the camera 14.

The camera 14 further comprises an illumination unit 28 comprising at least one light source component 30, the illumination unit 28 being configured to illuminate the inside/outside environment of the motor vehicle 12 monitored by the camera 14.

One particular aspect of the invention is that the power supply 15 signal of the camera 14 carried by the one wire connection 19 is used for supplying the imager integrated circuit 22 and the illumination unit 28. The power supply 15 of the camera 14 is a single power supply 15 for the camera 14.

Preferably, the illumination unit 28 comprises a plurality of infrared light-emitting diodes such that the light is not visible by a driver or a passenger of the motor vehicle 12. The infrared light source component 30 is especially used when the camera 14 illuminates the face of the driver in order to not blind the driver.

As shown in FIG. 1, in order to get control and/or diagnostic of the light source component, the illumination unit 28 comprises a light source driver 32. According to one embodiment, to save energy from the vision system 10, and more particularly to the illumination unit 28, the light source driver 32 provides a pulsed power supply signal to the light source component 30, as for example, with a 50% duty cycle such that current consumption over the light source component 30 is divided by two. Providing a pulsed power supply signal to the light source component 30 results in a pulsed illumination of the field of view 26 of the camera 14.

According to one embodiment, the imager integrated circuit 22 is in electrical communication with the illumination unit 28. More particularly, the imager integrated circuit 22 is able to provide a trigger signal to the illumination unit 28 such that the illumination of the field of view is synchronized with the capture of the images by the imager integrated circuit 22. In addition, the light source driver 32 comprises a light source failure detection component able to diagnose a short circuit of the light source component 30, i.e. an over current consumption of the light source component 30. The light source failure detection component is further able to diagnose an open circuit of the light source component 30, i.e. a detection of a zero current consumption of the light source component 30 after the trigger signal of the imager integrated circuit 22.

According to the invention, the camera 14 comprises a first mixer/splitter interface unit 34 in electrical communication with the imager integrated circuit 22 and in electrical communication with the illumination unit 28. The first mixer/splitter interface unit 34 is in electrical communication with the one wire connection 19 by a camera bidirectional signal port 36. The camera bidirectional signal port 36 is connected to the coaxial cable 18 such that the camera bidirectional signal port 36 is configured to provide the power supply 15 of the camera 14 and the data control 31 signal from the ECU 16 to the first mixer/splitter interface unit 34. According to FIG. 1, the power supply 15 of the camera 14 is a power supply 15 external from the camera 14, said power supply 15 being provided by the ECU 16. More generally, the power supply 15 of the camera 14 may be any external power supply 15 wherein the power supply 15 signal is carrying the signals data 17 exchanged between the camera 14 and the ECU 16.

The first mixer/splitter interface unit 34 is configured to split the data control 31 signal from the power supply 15 of the camera 14 and to provide the split data control 31 signal to the imager integrated circuit 22. The first mixer/splitter interface unit 34 is further configured to provide the images data 33 from the imager integrated circuit 22 mixed with the power supply 15 signal of the camera 14 to the camera bidirectional signal port 36. The first mixer/splitter interface unit 34 is further configured to provide diagnostic data 29 of the light source component 30 from the imager integrated circuit 22 mixed with the split power supply 15 signal to the camera bidirectional signal port 36.

In addition, the first mixer/splitter interface unit 34 is configured to distribute the power supply 15 of the camera 14 to the imager integrated circuit 22 and to the illumination unit 28. Accordingly, the first mixer/splitter interface unit 34 is configured to provide a first input voltage 23 from the split power supply 25 of the camera 14, i.e. split from the data control 31 signal, to the imager integrated circuit 22, and to provide a second input voltage 27, distinct from the first input voltage 23, from the split power supply 25 of the camera 14 to the illumination unit 28.

The first input voltage 23 and the second input voltage 27 are distinct in the sense of the invention such that they are electrically isolated from each other in order to prevent disturbances on the first input voltage 23 coming from the second input voltage 27, wherein, the second input voltage may causes conductive electromagnetic disturbances and drop of current respectively due to pulsed power supply signal of the light source component 30 and due to inrush current of the light source component 30.

As non-limitative example, the first mixer/splitter interface unit 34 comprises a first voltage regulator element 40 configured to provide the first input voltage 23 to the imager integrated circuit 22 from the split power supply 25. Generally, the first voltage regulator element 40 is a buck or a boost voltage conversion device that provides the necessary stabilized voltage for the imager integrated circuit 22. In addition, in order to protect the first input voltage against the effect of the light source power supply, the first mixer/splitter interface unit 34 comprises a second voltage regulator element 42 configured to provide the second input voltage 27 to the illumination unit 22 from the split power supply 25. More particularly, the second voltage regulator element 42 comprises a constant current source 44 and an energy storage component 46 configured to be fed by the constant current source 44, said energy storage component 46 being configured to provide the second input voltage to the illumination unit 28. The energy storage component 46 may be a capacitor element designed to provide additional energy to the light source component 30 during inrush current phase of the light source component 30.

The first mixer/splitter interface unit 34 comprises a first power over coaxial (PoC) filter element 48 in electrical communication with the camera bidirectional signal port 36, said first PoC filter element 48 being configured to split the data control 31 signal from the power supply 15 signal and to provide the split data control 31 signal to the imager integrated circuit 22. The first PoC filter element 48 is further configured to mix the images data 33 with the power supply 15 signal. The first PoC filter element 48 is further configured to provide the diagnostic data 29 from the imager integrated circuit 22 mixed with the power supply 15 signal of the camera 14 to the camera bidirectional signal port 36.

The first PoC filter element 48 is further configured to provide the split power supply 25 signal from the power supply 15 carrying the signals data 17 to the first voltage regulator 40 and to the second voltage regulator 42.

According to one embodiment of the invention, and to FIG. 1, the ECU 16 comprises the complementary electronic components for establishing a current-carrier communication with the camera 14 through the coaxial cable 18. Accordingly, the ECU 16 comprises an ECU bidirectional signal port 50 and a second mixer/splitter interface unit 52 in electrical communication with the ECU bidirectional signal port 50. The ECU 16 comprises the power supply 15 for the camera 14. The power supply 15 is provided by a third voltage regulator 54 of the ECU 16 electrically connected to the voltage source 20. More particularly, the third voltage regulator 54 is configured to provide an internal power supply 56 of the ECU 16, said internal power supply 56 being electrically connected to the second mixer/splitter interface unit 52.

The ECU 16 further comprises a microcontroller 58 configured to exchange the signals data 17 with the second mixer/splitter interface unit 52. Accordingly, the second mixer/splitter interface unit 52 is configured to provide the data control 31 signal mixed with the internal power supply 56 to the ECU bidirectional signal port 50 such that the ECU is configured to provide the power supply 15 of the camera 14 carrying the data control signal 31. The second mixer/splitter interface unit 52 is configured to receive the images data 33 mixed with the power supply 15 signal carried by one wire connection 19 and to split the images data 33 from the power supply 15 in order to provide the images data 33 to the microcontroller 58. Diagnostic data 29 of the light source component 30 are also split from the power supply 15 by the second mixer/splitter interface unit 52 such that the second mixer/splitter interface unit 52 is configured to provide the diagnostic data 29 to the microcontroller 58 of the ECU 16. To support the defined current-carrier communication between the ECU 16 and the camera, the coaxial cable 18 is connected at one extremity end to the ECU bidirectional signal port 50, and at the second extremity end to the camera bidirectional signal port 36.

The invention claimed is:
1. An apparatus comprising:
a camera configured to communicate with an electronic control unit (ECU) of a motor vehicle, the camera comprising:
an imager integrated circuit configured to capture images from an inside or outside environment of the motor vehicle;
an illumination unit comprising at least one light source component, the illumination unit being configured to illuminate an inside or outside environment of the motor vehicle;
a first mixer/splitter interface unit in electrical communication with the imager integrated circuit and the illumination unit; and
a camera bidirectional signal port in electrical communication with the first mixer/splitter interface unit, said camera bidirectional signal port being configured to provide a power and a data control signal via a single coaxial cable,
said first mixer/splitter interface unit being configured to split the data control signal and the power to provide the data control signal to the imager integrated circuit and the power to the imager integrated circuit and the illumination unit,
said first mixer/splitter interface unit being further configured to provide images data from the imager integrated circuit mixed with the power to the camera bidirectional signal port, and
said first mixer/splitter interface unit comprising:
a first voltage regulator element to produce, from the power a first input voltage for the imager integrated circuit; and
a second voltage regulator element to produce, from the power a second input voltage for the illumination unit, the second voltage regulator comprising a constant current source and an energy stor- age component fed by the constant current source and that provides additional energy, at the second input voltage, to the illumination unit during an inrush current phase of the illumination unit, wherein the first input voltage and the second input voltage are electrically isolated from each other such that the first input voltage is protected from electromagnetic disturbances and a drop of current due to the inrush current phase of the illumination unit.

2. The apparatus according to claim 1, wherein the first mixer/splitter interface unit comprises:
a first power over coaxial (PoC) filter element in electrical communication with the camera bidirectional signal port, said first PoC filter element being configured to split the data control signal from the power and to provide the split data control signal to the imager integrated circuit, wherein
the first voltage regulator element is in electrical communication with the first PoC filter element, and
the second voltage regulator element is in electrical communication with the first PoC filter element.

3. The apparatus according to claim 2, wherein in that the first PoC filter element is further configured to mix the images data with the power.

4. The apparatus according to claim 1, wherein the illumination unit comprises a light source driver configured to control the illumination of the light source component.

5. The apparatus according to claim 4, wherein the light source component is an infrared light source component.

6. The apparatus according to claim 4, wherein the light source driver is configured to provide a pulsed power signal to the light source component such that the light source component provides a pulsed illumination.

7. The apparatus according to claim 1, wherein the imager integrated circuit comprises a trigger pin in electrical communication with the illumination unit, the imager integrated circuit being configured to trigger the illumination unit.

8. The apparatus according to claim 1, wherein the illumination unit comprises a light source failure detection component configured to detect a failure of the light source component, said light source failure detection component being configured to provide light source component diagnostic data to the first mixer/splitter interface unit,
said first mixer/splitter interface unit being configured to provide the light source component diagnostic data mixed with the power to the camera bidirectional signal port.

9. A system, the system comprising:
a vision system that comprises:
a camera comprising:
an imager integrated circuit configured to capture images from an inside or outside environment of a motor vehicle;
an illumination unit comprising at least one light source component, the illumination unit being configured to illuminate an inside or outside environment of the motor vehicle;
a first mixer/splitter interface unit in electrical communication with the imager integrated circuit and the illumination unit; and
a camera bidirectional signal port in electrical communication with the first mixer/splitter interface unit, said camera bidirectional signal port being configured to provide a power and a data control signal,
said first mixer/splitter interface unit being configured to split the data control signal and the power to provide the data control signal to the imager integrated circuit and the power to the imager integrated circuit and the illumination unit,
said first mixer/splitter interface unit being further configured to provide image data from the imager integrated circuit mixed with the power to the camera bidirectional signal port, and
said first mixer/splitter interface unit comprising:
a first voltage regulator element to produce, from the power, a first input voltage to the imager integrated circuit; and
a second voltage regulator element to produce, from the power, a second input voltage to the illumination unit, the second voltage regulator comprising a constant current source and an energy storage component fed by the constant current source that provides additional energy, at the second input voltage, to the illumination unit during an inrush current phase of the illumination unit, wherein the first input voltage and the second input voltage are electrically isolated from each other such that the first input voltage is protected from electromagnetic disturbances and a drop of current due to the inrush current phase of the illumination unit;
an electronic control unit (ECU) comprising:
an ECU bidirectional signal port;
a second mixer/splitter interface unit in electrical communication with the ECU bidirectional signal port and an external power supply; and
a microcontroller configured to provide the data control signal to the second mixer/splitter interface unit; and
a single coaxial cable connected at one end to the ECU bidirectional signal port and connected at a second end to the camera bidirectional signal port,
the second mixer/splitter interface unit being configured to:
provide the data control signal mixed with the power to the ECU bidirectional signal port for transmission via the single coaxial cable
receive the image data mixed with the power via the coaxial cable from the ECU bidirectional signal port;
split the image data and the power; and provide the image data to the microcontroller.

10. The system according to claim 9, wherein the first mixer/splitter interface unit comprises:
a first power over coaxial (PoC) filter element in electrical communication with the camera bidirectional signal port, said first PoC filter element being configured to split the data control signal from the external power supply signal and to provide the split data control signal to the imager integrated circuit, wherein
the first voltage regulator element is in electrical communication with the first PoC filter element; and
the second voltage regulator element is in electrical communication with the first PoC filter element.

11. The system according to claim 10, wherein the first PoC filter element is further configured to mix the images data with the external power supply signal.

12. The system according to claim 9, wherein the illumination unit comprises a light source driver configured to control the illumination of the light source component.

13. The system according to claim 12, wherein the light source component is an infrared light source component.

14. The system according to claim 12, wherein the light source driver is configured to provide a pulsed power signal to the light source component such that the light source component provides a pulsed illumination.

15. The system according to claim 9, wherein the imager integrated circuit comprises a trigger pin in electrical communication with the illumination unit, the imager integrated circuit being configured to trigger the illumination unit.

16. The system according to claim 9, wherein the illumination unit comprises a light source failure detection component configured to detect a failure of the light source component, said light source failure detection component being configured to provide light source component diagnostic data to the first mixer/splitter interface unit, said first mixer/splitter interface unit being configured to provide the light source component diagnostic data mixed with the external power supply signal to the camera bidirectional signal port.

17. The system according to claim 9, wherein the system comprises the motor vehicle.

18. The system according to claim 9, wherein the vision system comprises the external power supply.

19. The apparatus according to claim 1, wherein the camera is electrically coupled with the ECU via a coaxial cable.

20. The apparatus according to claim 19, wherein the ECU comprises:

an ECU bidirectional signal port;

a second mixer/splitter interface unit in electrical communication with the ECU bidirectional signal port and an external power supply; and a microcontroller configured to provide the data control signal to the second mixer/splitter interface unit, the second mixer/splitter interface unit being configured to:

provide the data control signal from the external power supply mixed with the signal to the ECU bidirectional signal port such that the coaxial cable is configured to electrically carry the signal from the external power supply mixed with the data control signal;

receive the images data mixed with the signal from the external power supply carried by the coaxial cable; and split the images data from the external power supply in order to provide the images data to the microcontroller; and wherein the coaxial cable is connected at one extremity end to the ECU bidirectional signal port and is connected at a second extremity end to the camera bidirectional signal port.

* * * * *